United States Patent
Ergen et al.

(10) Patent No.: US 8,520,630 B2
(45) Date of Patent: Aug. 27, 2013

(54) METHOD AND APPARATUS FOR PREDICTING HANDOVER IN WIRELESS COMMUNICATION NETWORK

(75) Inventors: Mustafa Ergen, Oakland, CA (US);
Rehan Jalil, San Jose, CA (US); Pawan Uberoy, Milpitas, CA (US); Tony Mak, San Francisco, CA (US)

(73) Assignee: Wichorus, Inc., Santa Clara, CA (US)

( * ) Notice: Subject to any disclaimer, the term of this patent is extended or adjusted under 35 U.S.C. 154(b) by 1120 days.

(21) Appl. No.: 12/271,940

(22) Filed: Nov. 17, 2008

(65) Prior Publication Data

US 2010/0124200 A1 May 20, 2010

(51) Int. Cl.
*H04W 4/00* (2009.01)
(52) U.S. Cl.
USPC .......................................... 370/331; 370/332
(58) Field of Classification Search
USPC .......................................... 370/330, 331, 332
See application file for complete search history.

(56) References Cited

U.S. PATENT DOCUMENTS

| | | | | |
|---|---|---|---|---|
| 5,862,485 | A * | 1/1999 | Linneweh et al. | 455/450 |
| 2003/0142647 | A1 * | 7/2003 | Agrawal et al. | 370/331 |
| 2004/0005906 | A1 * | 1/2004 | Okumura et al. | 455/522 |
| 2005/0282546 | A1 * | 12/2005 | Chang et al. | 455/436 |
| 2008/0130585 | A1 * | 6/2008 | Park et al. | 370/332 |

* cited by examiner

*Primary Examiner* — Sai-Ming Chan
(74) *Attorney, Agent, or Firm* — Hamilton, Brook, Smith & Reynolds, P.C.

(57) ABSTRACT

A method and apparatus for predicting a handover of a Mobile Station (MS) of a plurality of MSs to one or more target Base Stations (BSs) of a plurality of BSs in a wireless communication network. The method includes predicting a need for a handover of a MS to one or more target BSs selected from the plurality of BSs based on a handover threshold. The handover threshold is associated with a quality of a signal received by the MS. The method further includes transferring datapath associated with the MS to one or more of the one or more target BSs and one or more gateways prior to the handover of the MS. The one or more gateways are associated with one or more of a serving BS associated with the MS and the one or more target BSs. The plurality of BSs includes the serving BS.

28 Claims, 8 Drawing Sheets

METHOD AND APPARATUS FOR PREDICTING HANDOVER IN WIRELESS COMMUNICATION NETWORK

FIELD OF THE INVENTION

The invention generally relates to a wireless communication network. More specifically, the invention relates to apparatus and method for predicting handover in wireless communication network.

BACKGROUND OF THE INVENTION

A wireless communication network typically includes a plurality of gateways, such as an ASN-Gateway. Each gateway of the plurality of gateways communicates with a plurality of Base Stations (BSs). Further, each BS of the plurality of BSs communicates with one or more Mobile Stations (MSs).

Generally, in the wireless communication network, a MS is handed over to a target BS of the plurality of BSs whenever a communication link between the MS and a serving BS deteriorates. To perform the handover the MS, the target BS and a gateway associated with target BS are prepared for the handover. The time required to complete the handover of the MS is known as handover execution time (HET).

An increase in duration of the HET may increase the probability of failure of the handover of the MS. For instance, when the HET is large the communication link between the MS and the serving BS may be lost before the handover of the MS from the serving BS to the target BS is completed. As a result of this, services provided to the user of the MS may be interrupted.

Therefore, there is a need of a method and apparatus to minimize a HET.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
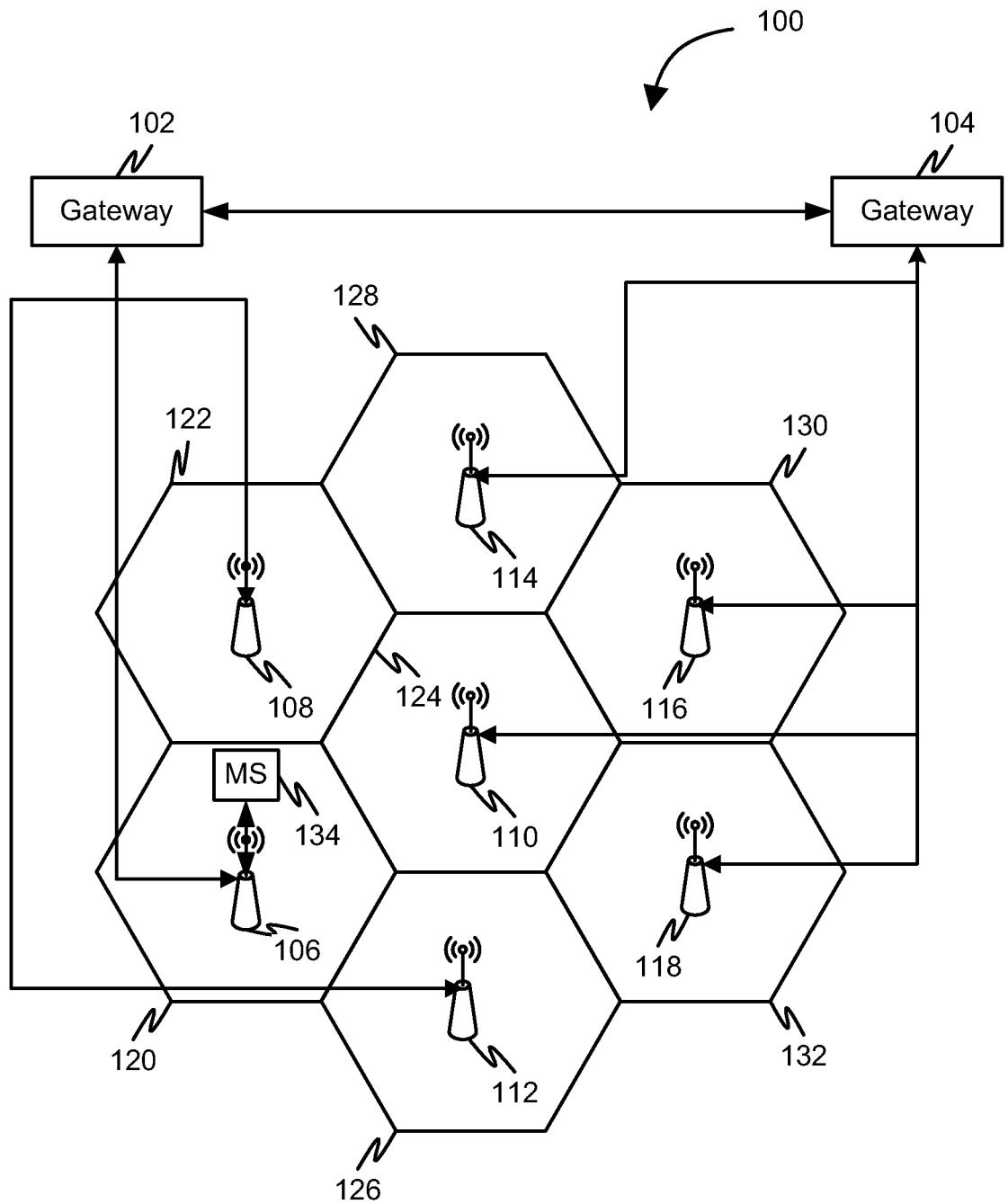
FIG. 1 illustrates a block diagram of a wireless communication network in which various embodiments of the invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to performing a handover in a wireless communication network. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as, first and second, top and bottom, and the like may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the invention provide methods and apparatuses for predicting a handover of a Mobile Station (MS) in a wireless communication network. The method includes predicting a need for a handover of the MS to one or more target Base Stations (BSs) selected from a plurality of BSs based on a handover threshold. The handover threshold is associated with a quality of a signal received by the MS. The method further includes transferring datapath associated with the MS to one or more of the one or more target BSs and one or more gateways prior to the handover of the MS. The one or more gateways are associated with one or more of the serving BS and the one or more target BSs.

FIG. 1 illustrates a block diagram of a wireless communication network 100 in which various embodiments of the invention may function. Wireless communication network 100 is depicted as a cellular network. However, it will be apparent to a person skilled in the art that wireless communication network 100 may have any other structure known in the art. Examples of wireless communication network 100 may include, but are not limited to, a Wireless Interoperability Microwave Access (WiMAX) communication network, a 3rd Generation Partnership Project (3GPP) Long Term Evolution (LTE) network, a 3rd Generation Partnership Project 2 (3GPP2) Ultra Mobile Broadband (UMB) network, a Wireless Fidelity (WiFi) network, and any variant of an Orthogonal Frequency Division Multiple Access (OFDMA) communication network.

Wireless communication network 100 includes one or more gateways such as, a gateway 102 and a gateway 104, and a plurality of Base Stations (BSs) such as, a BS 106, a BS 108, a BS 110, a BS 112, a BS 114, a BS 116 and a BS 118. Gateway 102 and gateway 104 may communicate with each other. In case, wireless communication network 100 is a WiMAX communication network, each of the one or more gateways are Access Service Network (ASN)-Gateways.

Each of the one or more gateways may communicate with one or more BSs of the plurality of BSs in wireless communication network 100. For example, gateway 102 communicates with BS 106, BS 108 and BS 112, and gateway 104 communicates with BS 110, BS 114, BS 116 and BS 118 to perform various services in wireless communication network 100. Examples of the services may include, but are not limited to, video distribution, vehicle tracking, e-learning, web browsing, and weather monitoring.

Each BS of the plurality of BSs has a corresponding cell. For example, BS 106 has a cell 120, BS 108 has a cell 122, BS 110 has a cell 124, BS 112 has a cell 126, BS 114 has a cell 128, BS 116 has a cell 130, and BS 118 has a cell 132. A BS of the plurality of BSs has one or more neighboring BSs, which are collocated with the BS. For example, cell 122 of BS 108, cell 124 of BS 110 and cell 126 of BS 112 are adjacent to cell 120 of BS 106. Alternatively, a cell of the BS and cells of the one or more neighboring BSs may have one or more overlapping regions.

The plurality of BSs communicates with a plurality of Mobile Stations (MSs) to provide the various services in wireless communication network 100. For example, BS 106 communicates with a MS 134 in cell 120. Examples of a MS may include, but are not limited to a laptop, a personal digital assistant (PDA), a mobile phone, and any hand-held devices using which a subscriber avails the various services.

Typically, a quality of a signal received by a MS from a serving BS of the plurality of BSs varies based on one or more factors. One of the one or more factors is distance of the MS from the serving BS. The quality of the signal is determined from one or more of a Received Signal Strength Indication (RSSI), a Signal to Noise Ratio (SNR), and a Channel to Noise Interference Ratio (CNIR). For example, with increase in distance of MS 134 from BS 106, a quality of a signal received by MS 134 from BS 106 may gradually degrade. In such an instance, there may be a need to handover MS 134 to a BS neighboring to BS 106, i.e., one of BS 108, BS 110, and BS 112, to provide uninterrupted connectivity to MS 134.

Figure 2:
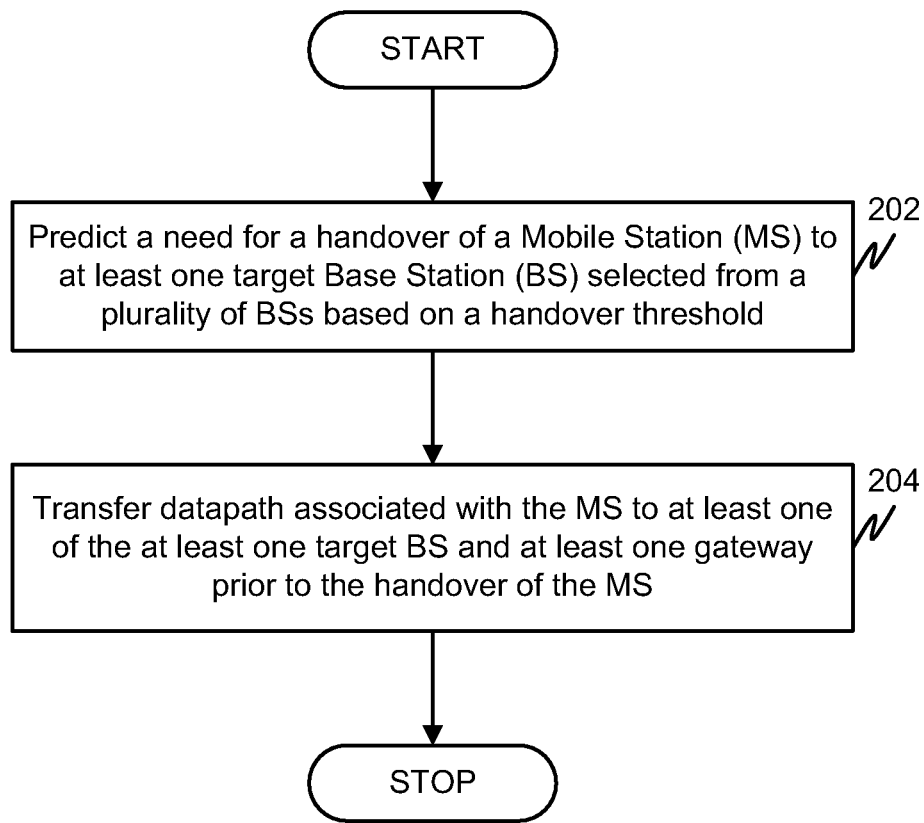
FIG. 2 illustrates a flow diagram of a method for predicting handover in a wireless communication network in accordance with an embodiment of the invention.

FIG. 2 illustrates a flow diagram of a method for predicting a handover in wireless communication network 100, in accordance with an embodiment of the invention. In a wireless communication network, a MS served by a serving BS may frequently move away from the serving BS. In such a case, a communication link between the MS and the serving BS is lost thereby interrupting the services provided to a user of the MS. To provide uninterrupted services to the user of the MS, at step 202, a need for a handover of the MS to one or more of target BSs is predicted based on a handover threshold. The one or more target BSs are selected from a plurality of BSs. The one or more target BSs are neighboring to the serving BS. A cell of each target BS of the one or more target BSs is adjacent to a cell of the serving BS. Alternatively, one or more portions of the cell of each target BS of the one or more target BSs may overlap with the cell of the serving BS.

The handover threshold is associated with a quality of a signal received by the MS. The need for handover of the MS is predicted, when a quality of a signal received by the MS from the serving BS is below the handover threshold. A network administrator may vary the handover threshold depending on requirements in wireless communication network 100. The handover threshold includes a first threshold value and a control parameter value. The first threshold value is a minimum quality of a signal to be received by the MS from the serving BS to maintain the communication link between the MS and the serving BS. Accordingly, the handover of the MS is performed when the quality of the signal received by the MS from the serving BS is less than the first threshold value. The control parameter value corresponds to a value associated with a quality of a signal. The control parameter facilitates in predicting the need for the handover of the MS before the quality of the signal received by the MS from the serving BS falls below the first threshold value. The control parameter value may be varied based on requirements of wireless communication network 100 by the network administrator.

For example, in a wireless communication network a handover threshold may be set as 120 decibels (db). Therefore, whenever strength of a signal received by MS 134 from BS 106 falls below 120 db, a need to handover MS 134 to another BS of the plurality of BSs is predicted. The strength of the signal received by MS 134 may decrease when a distance between MS 134 and BS 106 increases. The handover threshold includes a first threshold value of 100 db and a control parameter value of 20 db. After the prediction, when the strength of the signal received by MS 134 falls below 100 db, the handover of MS 134 is performed. Therefore, by using the control parameter value of 20 db, the need for the handover of MS 134 is predicted well before the strength of the signal received by MS 134 from BS 106 falls below the first threshold value of 100 db.

Once the need for the handover of the MS is predicted, one or more of the one or more target BSs and one or more gateways are prepared for the handover of the MS. To achieve this, at step 204, datapath associated with the MS is transferred to one or more of the one or more target BSs and the one or more gateways prior to the handover of the MS. The one or more gateways serve one or more of the one or more target BSs and the serving BS. A datapath associated with the MS is the information required to establish a communication link with the MS. The datapath associated with the MS is stored in the serving BS. Alternatively, the datapath associated with the MS may be stored in a gateway serving the serving BS.

For example, BS 108 and BS 110 are identified as the one or more target BSs for handover of MS 134. Therefore, BS 108 and BS 110 are prepared for the handover of MS 134. For this, initially BS 106 instructs gateway 102 to transfer the datapath of MS 134 to BS 108. Thereafter, gateway 102 transfers the datapath to BS 108 to prepare BS 108 for the handover. The datapath in this case, enables in establishing a communication link between BS 108 and MS 134. Further, in the case of BS 110, initially BS 106 instructs gateway 102 to transfer the datapath to gateway 104 that communicates with BS 110. Thereafter, gateway 102 transfers the datapath to gateway 104 to prepare gateway 104 for the handover. Gateway 104 then transfers the datapath to BS 110 to prepare BS 110 for handover of MS 134. The datapath in this instance facilitates in establishing a communication link between BS 110 and MS 134.

The one or more target BSs and the one or more gateways are prepared for the handover before initiating the handover of the MS. This avoids the process of preparing one or more of the one or more target BSs and the one or more gateways for the handover while performing the handover of the MS, thereby reducing HET. As a result of this, the MS experiences uninterrupted communication services during the handover.

Figure 3A:
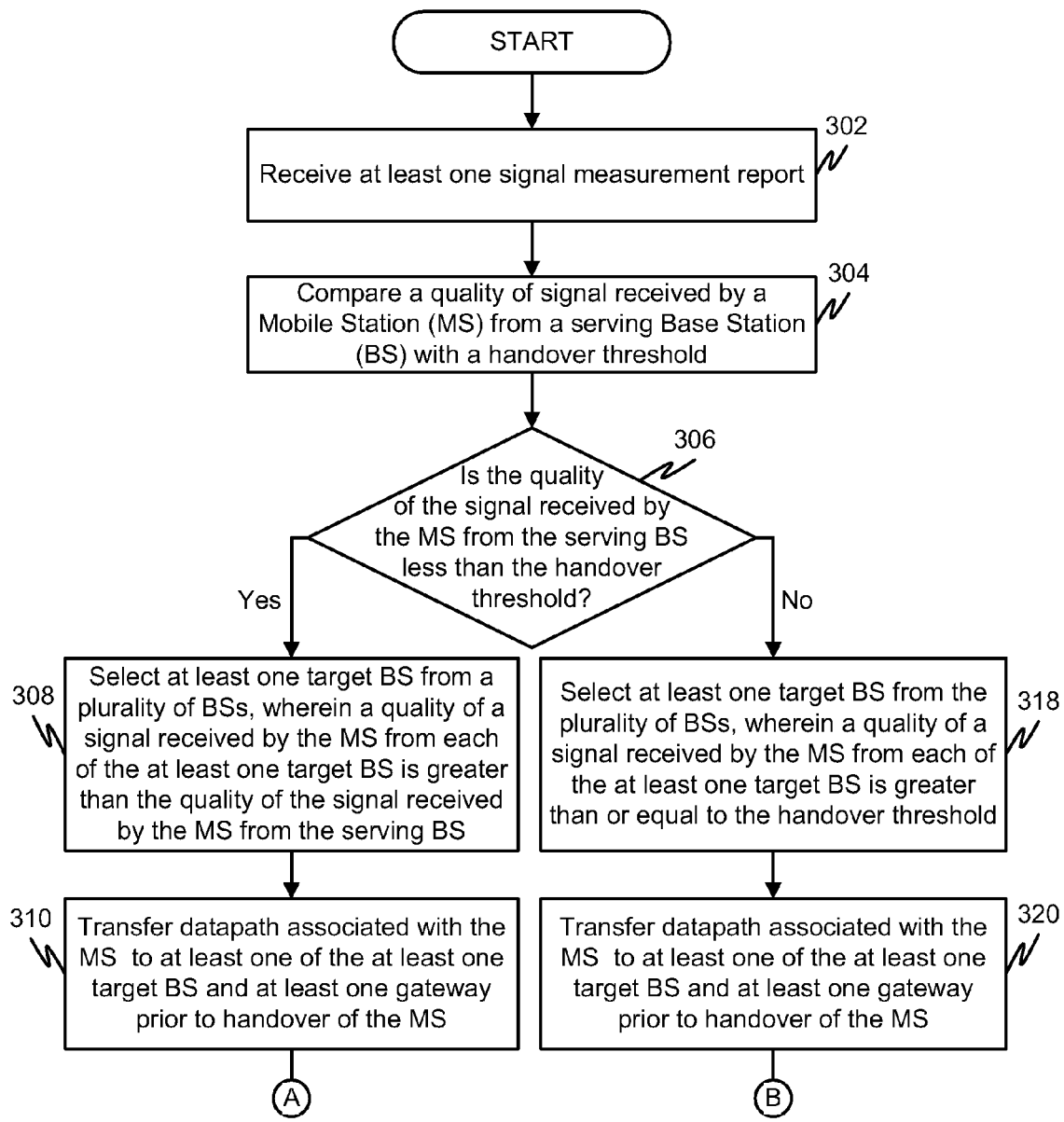
FIGS. 3A and 3B illustrate a flow diagram of a method for predicting handover in a wireless communication network in accordance with another embodiment of the invention.
Figure 3B:
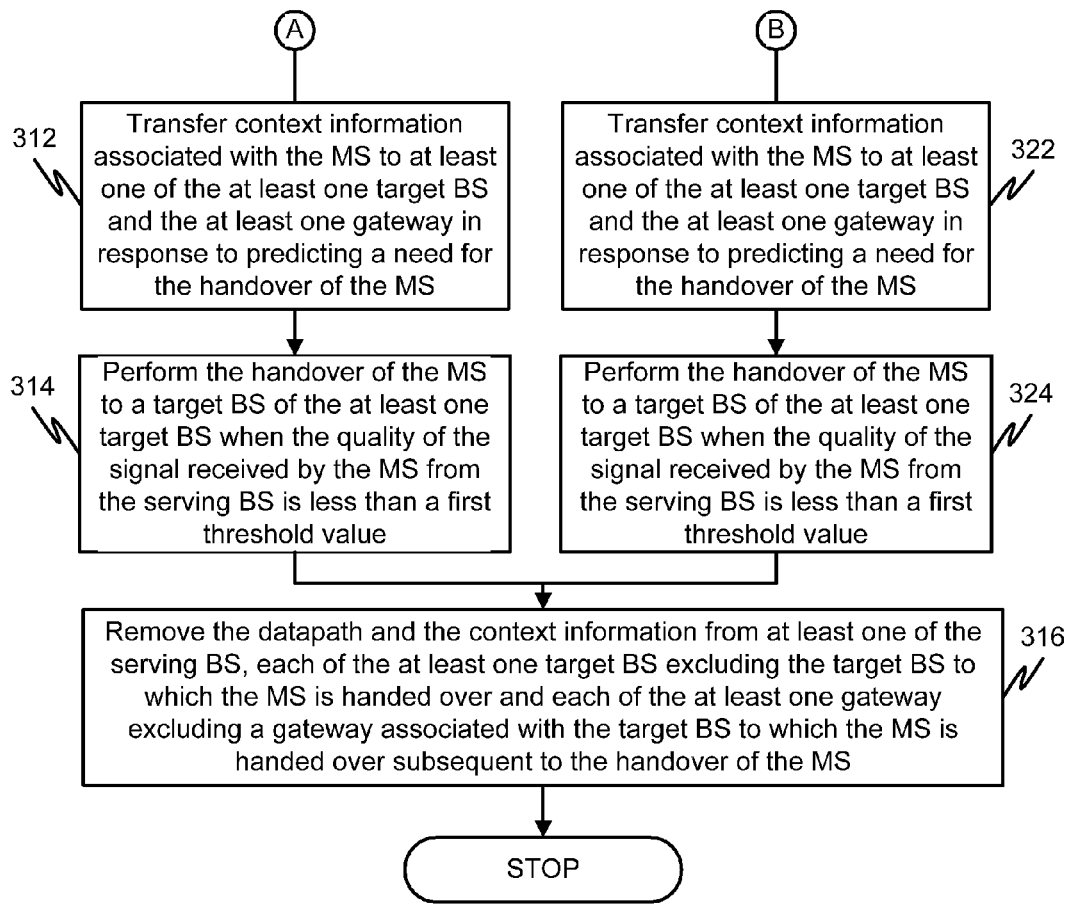

FIGS. 3A and 3B illustrate a flow diagram of a method for predicting a handover in wireless communication network 100, in accordance with another embodiment of the invention. At step 302, one or more signal measurement reports are received by one or more of a serving BS and a gateway communicating with the serving BS. Each signal measurement report of the one or more signal measurement reports includes a quality of a signal received by a MS from one or more BSs of a plurality of BSs. The one or more signal measurement reports may be received periodically. Alternatively, the one or more signal measurement reports may be received in response to a request generated by one or more of the serving BS and the gateway.

A signal measurement report of the one or more signal measurement reports received for the serving BS is analyzed to determine the quality of the signal received by the MS from the serving BS. Thereafter, the quality of the signal received by the MS from the serving BS is compared with a handover threshold at step 304. The handover threshold is explained in detail in conjunction with FIG. 2. Thereafter, a check is performed to determine if the quality of the signal received by the MS from the serving BS is less than the handover threshold at step 306.

If the quality of the signal received by the MS from the serving BS is less than the handover threshold, a need for the handover of the MS is predicted. Thereafter, at step 308, one or more target BSs are selected from the plurality of BSs such that a quality of signal received by the MS from each of the one or more target BSs is greater than the quality of the signal received by the MS from the serving BS. The one or more target BSs are neighboring to the serving BS.

For example, in a wireless communication network a handover threshold may be set as 120 decibels (db). The handover threshold includes the first threshold value of 100 db and the control parameter value of 20 db as explained in conjunction with FIG. 2. Based on analysis of one or more signal measurement reports, when strength of the signal received by MS 134 from BS 106 falls below 120 db, BS 106 predicts a need for the handover of MS 134. In addition, based on the one or more signal measurement reports, BS 106 identifies that strength of signals received from BS 108 and BS 110 is greater than the strength of the signal received from BS 106. Therefore, BS 108 and BS 110 are identified as target BSs for the handover of MS 134.

In addition to the criteria for selecting the one or more target BS mentioned above, the one or more target BS may be selected such that a difference between the quality of the signal received by the MS from each of the one or more target BSs and the quality of the signal received by the MS from the serving BS is greater than or equal to a difference between a second threshold value and a control parameter value. The second threshold value corresponds to a value associated with a quality of a signal. A network administrator may vary the second threshold value depending on requirements on wireless communication network 100. The control parameter value is explained in detail in conjunction with FIG. 2.

For example, to confirm the identification of BS 108 and BS 110 as target BSs, a second threshold value of 50 db is defined. In this case, BS 108 and BS 110 are confirmed as suitable for the handover, when BS 106 identifies that a difference between strength of a signal received from each of BS 108 and BS 110 and strength of signal received from BS 106 is greater than or equal to a difference of the second threshold value of 50 db and the control parameter of 20 db, i.e., 30 db. By using such additional criterion for identifying the one or more target BSs, target BSs capable of providing signals relatively higher than the handover threshold or the first threshold value may be identified. As a result of this, frequent handover of MS 134 to multiple BSs in the wireless communication network may be avoided.

Once the one or more target BS are selected, at step 310, a datapath associated with the MS is transferred to one or more of the one or more target BSs and one or more gateways associated with one or more of the one or more target BSs and the serving BS. This has been explained in conjunction with FIG. 2.

Thereafter, at step 312, context information associated with the MS is transferred to one or more of the one or more target BSs and the one or more gateways in response to predicting the need for the handover of the MS. Therefore, the context information associated with the MS is transferred prior to the handover of the MS. The context information of the MS may include for example, but are not limited to, a profile, a security context, and other characteristics of the MS. In a scenario, when a target BS of the one or more target BSs and the serving BS are served by a single gateway, the context information of the MS may be transferred by the serving BS to the target BS. In this case, the context information is stored in the serving BS. Alternatively, when the target BS and the serving BS are served by different gateways, the context information of the MS may be initially transferred to a gateway communicating with the target BS. Thereafter, the gateway transfers the context information to the target BS.

Alternatively, the context information of the MS may be stored in an anchor gateway. The MS is initially connected to the anchor gateway, when the MS enters a wireless communication network or when the MS is switched on. In this case, a gateway communicating with the serving BS obtains the context information from the anchor gateway.

By transferring the datapath and the context information, the one or more target BSs and the one or more gateways are prepared for the handover of the MS. The handover of the MS to a target BS of the one or more target BSs is performed when the quality of the signal received by the MS from the serving BS is less than the first threshold value at step 314. When the handover of the MS is performed, a new communication link is established between the target BS and the MS for providing continuing services to a user of the MS. In a scenario, before performing the handover of the MS, a check is performed to identify whether a BS to which the MS is to be handed over is the target BS of the one or more target BSs. If the BS is the target BS, then the MS is handed over to the target BS. In this case, the HET will be less. Further, if the BS is not the target BS, the MS may be handed over to the BS using a traditional handover process having a large HET.

Thereafter, at step 316, the datapath and the context information are removed from one or more of the serving BS, each of the one or more target BSs excluding the target BS to which the MS is handed over, and each of the one or more gateways excluding the gateway associated with the target BS to which the MS is handed over subsequent to the handover of the MS.

For example, after identifying BS 108 and BS 110 as target BSs, datapath and context information of MS 134 is transferred to each of BS 108, and gateway 104, and BS 110. Considering that the MS 134 is handed over to BS 108, the datapath and the context information associated with MS 134 may be removed from BS 106 that initially served MS 134, gateway 104 associated with BS 110, and BS 110. This is further explained in conjunction with FIG. 7.

Referring back to step 306, if the quality of the signal received by the MS is greater than or equal to the handover threshold, at step 318, one or more target BSs are selected from the plurality of BSs. A quality of a signal received by the MS from each of the one or more target BSs is greater than or equal to the handover threshold. The one or more target BSs are neighboring to the serving BS.

In addition to the criteria for selecting the one or more target BS mentioned above, the one or more target BS may be selected such that a difference between a quality of signal received by the MS from each of the one or more target BSs and the quality of the signal received by the MS from the serving BS is greater than or equal to the difference between the second threshold value and the control parameter value. This criteria of selecting the one or more target BSs has been explained in detail above in FIGS. 3A and 3B.

Once the one or more target BS are selected, the datapath associated with the MS is transferred to one or more of the one or more target BSs and one or more gateways associated with one or more of the one or more target BSs and the serving BS, at step 320. This has been explained in conjunction with FIG. 2. Thereafter, at step 322, the context information associated with the MS is transferred to one or more of the one or more target BSs and the one or more gateways in response to predicting the need for handover of the MS. This has been explained in detail above in conjunction with the step 312. Thereafter, step 316 is repeated.

Figure 4:
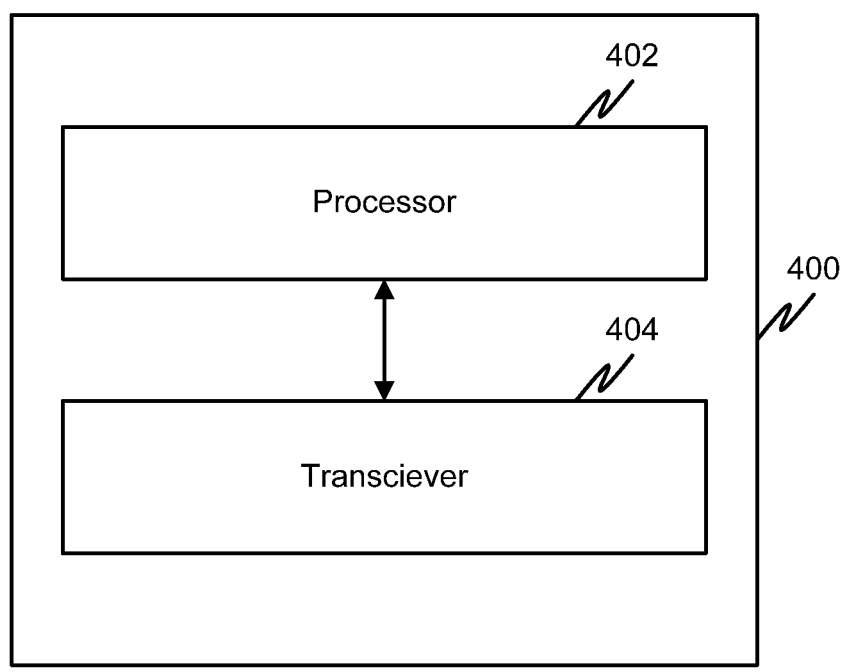
FIG. 4 illustrates a block diagram of an apparatus for communication in a wireless communication network in accordance with an embodiment of the invention.

FIG. 4 illustrates a block diagram showing an apparatus 400 for communication in a wireless communication network 100, in accordance with an embodiment of the invention. Apparatus 400 includes a processor 402 and a transceiver 404. Apparatus 400 may be one of a serving BS of the plurality of BSs, and a gateway. Transceiver 404 receives one or more signal measurement reports. The one or more signal measurement reports are explained in detail in conjunction with FIGS. 3A and 3B.

When apparatus 400 is the serving BS, transceiver 404 receives the one or more signal measurement reports from a MS served by the serving BS. Alternatively, when apparatus 400 is a gateway communicating with the serving BS, transceiver 404 receives the one or more signal measurement reports from the serving BS served by the gateway.

Processor 402 receives and analyzes the one or more signal measurements reports from transceiver 404. Thereafter, processor 402 predicts a need for a handover of the MS to one or more target BSs selected from the plurality of BSs based on a handover threshold. The handover threshold is explained in detail in conjunction with FIG. 2. To predict the need for the handover of the MS, processor 402 compares a quality of a signal received by the MS from the serving BS with the handover threshold. Processor 402 then performs a check to determine whether the quality of the signal received by the MS from the serving BS is less than the handover threshold as explained in detail in conjunction with FIGS. 3A and 3B.

In one scenario, if the quality of the signal received by the MS from the serving BS is less than the handover threshold, the one or more target BSs are selected by processor 402 from the plurality of BSs. A quality of a signal received from each of the one or more target BSs is greater than the quality of the signal received by the MS from the serving BS. This is explained in detail in conjunction with FIGS. 3A and 3B.

In another scenario, if the quality of the signal received by the MS from the serving BS is greater than or equal to the handover threshold, the one or more target BSs are selected by processor 402 from the plurality of BSs. In this case, a quality of a signal received from each of the one or more target BSs is greater than or equal to the handover threshold. This is explained in detail in conjunction with FIGS. 3A and 3B.

Once the one or more target BSs are identified, the one or more target BSs and one or more gateways associated with the one or more target BSs are prepared for handover of the MS. Transceiver 404 transfers datapath associated with the MS to one or more of the one or more target BSs and one or more gateways prior to the handover of the MS. The one or more gateways are associated with one or more of the serving BS associated with the MS and the one or more target BSs.

Additionally, transceiver 404 transfers context information associated with the MS to one or more of the one or more target BSs and the one or more gateways in response to predicting the need for the handover of the MS. The context information is transferred prior to the handover of the MS.

Thereafter, processor 402 performs the handover of the MS to a target BS of the one or more target BSs identified, when the quality of the signal received by the MS from the serving BS is less than the first threshold value. Thereafter, processor 402 may remove the datapath and the context information associated with the MS from one or more of the serving BS, each of one or more target BSs excluding the target BS to which the MS is handed over and each of the one or more gateways excluding the gateway associated with the target BS to which the MS is handed over subsequent to the handover of the MS. This is explained in conjunction with FIGS. 3A and 3B.

Figure 5:
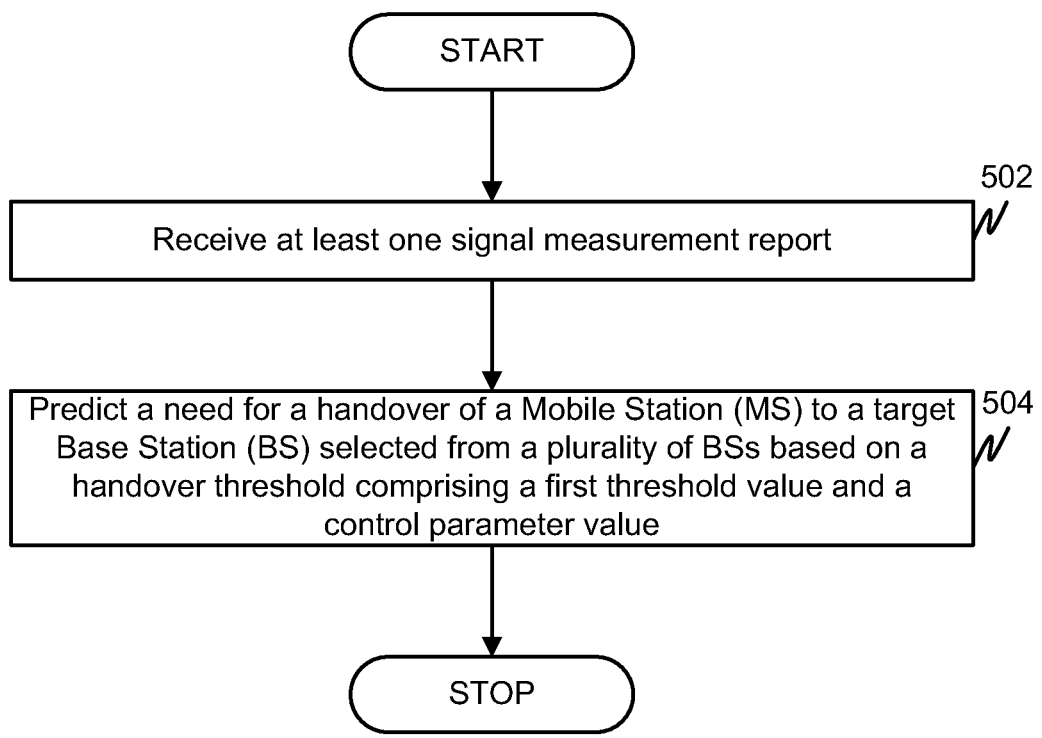
FIG. 5 illustrates a flow diagram of a method for managing handover in a wireless communication network in accordance with an embodiment of the invention.

FIG. 5 illustrates a flow chart showing a method for managing a handover in a wireless communication network in accordance with an embodiment of the invention. At step 502, one or more signal measurement reports are received by a serving BS from a MS. Each of the one or more signal measurement reports includes a quality of a signal received by the MS from a BS of a plurality of BSs. The plurality of BSs includes the serving BS. A signal measurement report of the one or more signal measurement reports received for the serving BS is analyzed to determine a quality of a signal received by the MS from the serving BS. Subsequently at step 504, a need for the handover of the MS to one or more of target BSs selected from a plurality of BSs is predicted based on a handover threshold. The handover threshold includes a first threshold value and a control parameter.

The need of the handover of the MS is predicted, when the quality of the signal received by the MS from the serving BS is less than the handover threshold. In this case, the control parameter facilitates in predicting the need for the handover of the MS before the quality of the signal received by the MS from the serving BS falls below the first threshold value. Thereafter, the handover of the MS is performed to a target BS of the one or more target BSs when the quality of signal received by the MS from the serving BS is less than the first threshold value.

Figure 6:
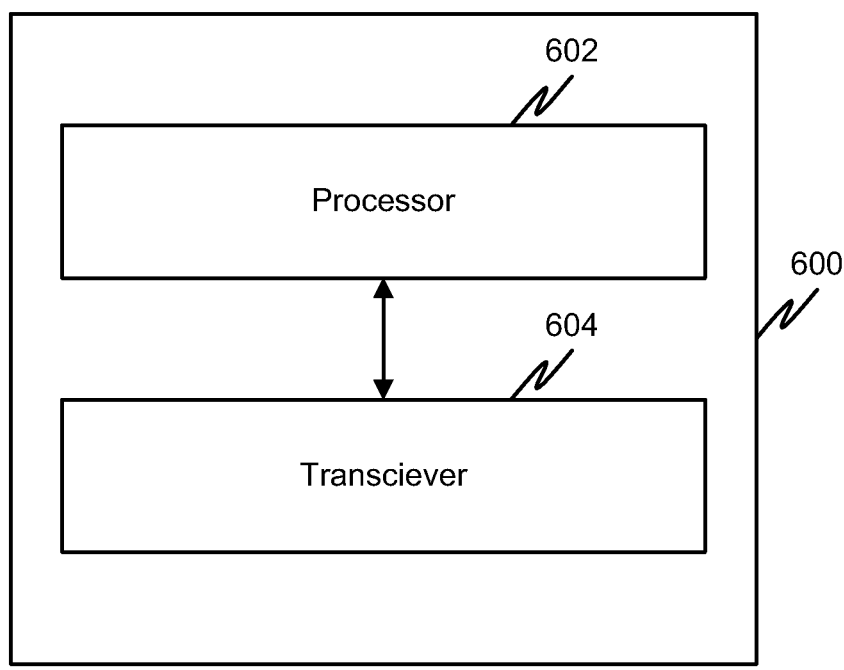
FIG. 6 illustrates a block diagram of an apparatus for managing handover in a wireless communication network in accordance with an embodiment of the invention.

FIG. 6 illustrates a block diagram showing an apparatus 600 for managing handover in a wireless communication network in accordance with an embodiment of the invention. Apparatus 600 includes a processor 602 and a transceiver 604. Apparatus 600 may be a MS. Transceiver 604 receives signals from each BS of a plurality of BSs. Apparatus 600 analyzes the signals to determine a quality of the signals. Accordingly, processor 602 analyzes a signal associated with a serving BS to determine a quality of the signal received by a MS from the serving BS. The plurality of BSs includes the serving BS. Additionally, processor 602 may generate one or more signal measurement reports based on the analysis of the signals received. The one or more signal measurements are explained in conjunction with FIG. 5.

Thereafter, processor 602 predicts a need for a handover of the MS to one or more target BSs selected from the plurality of BSs based on a handover threshold. The need of the handover of the MS is predicted, when the quality of the signal received by the MS from the serving BS is less than the handover threshold. The handover threshold includes a first threshold value and a control parameter value. Thereafter, the handover of the MS is performed to a target BS of the one or more target BSs when the quality of signal received by the MS from the serving BS is less than the first threshold value.

Figure 7:
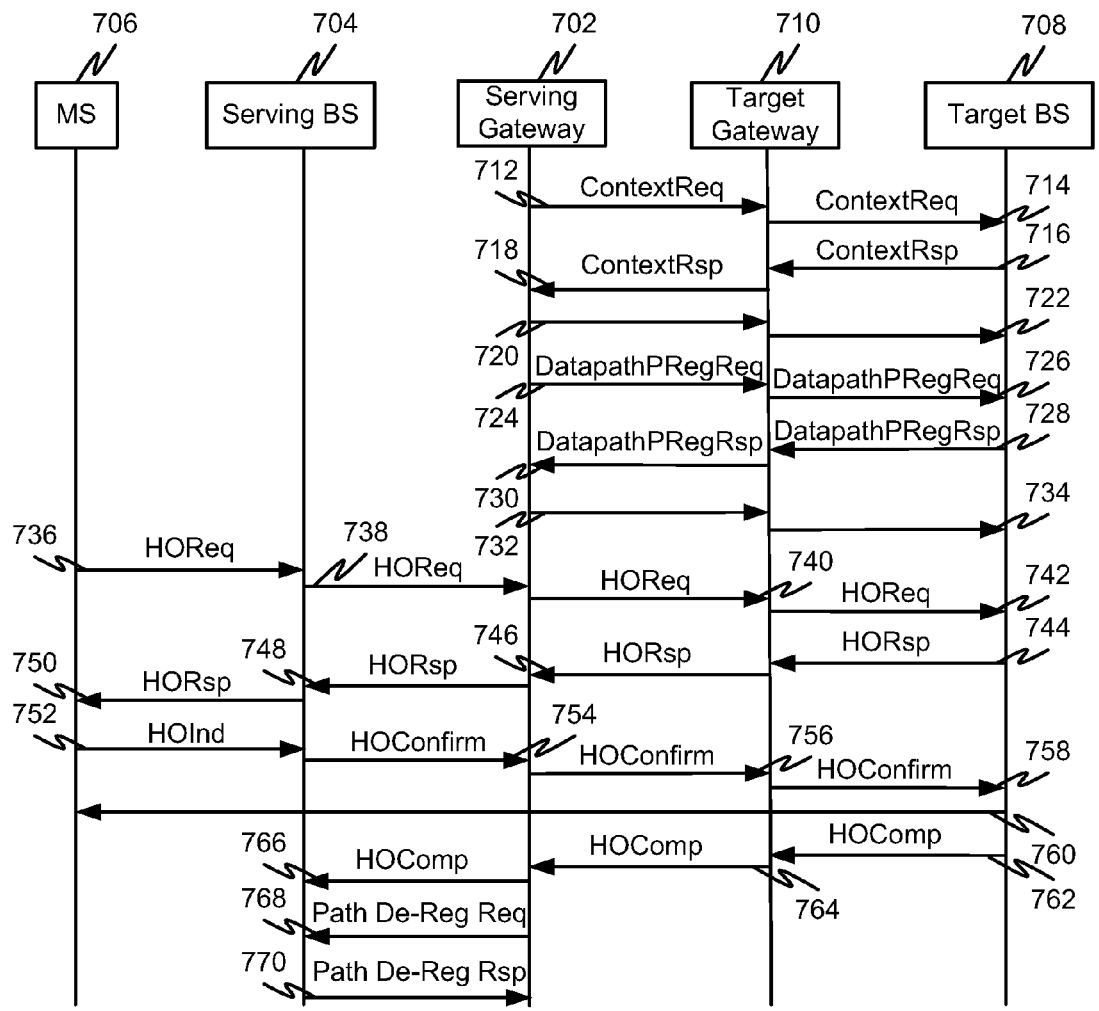
FIG. 7 illustrates a flow diagram of a method for predicting handover in a wireless communication network in accordance with an embodiment of the invention.

FIG. 7 illustrates a data flow diagram showing a method for handover in a wireless communication network 100, in accordance with an exemplary embodiment of the invention. A serving gateway 702 communicating with a serving BS 704 of a plurality of BSs receives one or more signal measurement reports from a MS 706. Serving gateway 702 analyzes the one or more signal measurement reports associated with serving BS 704 to determine a quality of a signal received by MS 706 from serving BS 704. In this case, based on the one or more signal measurement reports, serving gateway 702 predicts a need for performing a handover of MS 706 from serving BS 704 to a target BS 708 served by a target gateway 710, which is neighboring to serving BS 704. Target BS 708 may be selected from the plurality of BSs. After predicting a need for the handover, target BS 708 and target gateway 710 are prepared for the handover of MS 706.

To prepare target BS 708 and target gateway 710, at step 712, serving gateway 702 sends a context transfer request (ContextReq) to target gateway 710 to check whether context information associated with MS 706 should be transferred. Target gateway 710 forwards the ContextReq to target BS 708, at step 714. In response to the ContextReq, target BS 708 sends a context response (ContextRsp) to target gateway 710, at step 716, confirming that the context information can be transferred. Thereafter, target gateway 710 forwards the ContextRsp to serving gateway 702, at step 718. Subsequently, based on the ContextRsp, serving gateway 702 transfers the context information to target gateway 710, at step 720, which forwards the context information to target BS 708 at step 722.

After transferring the context information, at step 724, serving gateway 702 sends a datapath pre-registration request (DatapathPRegReq) to target gateway 710 to check whether datapath associated with MS 706 should be transferred. Target gateway 710 then forwards the DatapathPRegReq to target BS 708, at step 726. In response to the DatapathPRegReq, target BS 708 sends a datapath pre-registration response (DatapathPRegRsp) to target gateway 710, at step 728, to confirm that the datapath can be transferred. Target gateway 710 forwards the DatapathPRegRsp to serving gateway 702, at step 730. Once the datapath pre-registration request and their responses are exchanged, serving gateway 702 transfers the datapath associated with MS 706 to target gateway 710 at step 732. Target gateway 710 then forwards the datapath to target BS 708 at step 734. By transferring the datapath and the context information, target gateway 710 and target BS 708 are prepared for the handover of MS 706, before the handover of MS 706 is initiated.

Thereafter, the handover of MS 706 is initiated. In this case, MS 706 initiates the handover by sending a handover request (HOReq) to serving BS 704, at step 736. Alternatively, the handover may be initiated by one of serving BS 704 and serving gateway 702. Thereafter, serving BS 704 forwards the HOReq to serving gateway 702 at step 738. Serving gateway 702 forwards the HOReq to target gateway 710, at step 740, which then forwards the HOReq to target BS 708 at step 742. In response to the HOReq, target BS 708 sends a handover response (HORsp) to target gateway 710 at step 744. Thereafter, target gateway 710 sends the HORsp to serving gateway 702, at step 746, which forwards the HORsp to serving BS 704 at step 748. Then, serving BS 704 sends the HORsp to MS 706, at step 750. Thereafter, at step 752, MS 706 sends a handover indicator (HOInd) to serving BS 704 to perform the handover of MS 706. Thereafter, serving BS 704 sends a handover confirmation (HOConfirm) to serving gateway 702, at step 754, which sends the HOConfirm to target gateway 710, at step 756. Thereafter, at step 758, target gateway 710 sends the HOConfirm to target BS 708. The HOConfirm send by serving BS 704 and serving gateway 702 indicates that serving BS 704 and serving gateway 702 are ready for the handover of MS 706.

Thereafter at step 760, target BS 708 sends data packets to MS 706. The data packets may be associated with the various services provided to a user of MS 706 in wireless communication network 100. When the connectivity is established, target BS 708 sends a handover completion indicator (HOComp) to target gateway 710 notifying that the handover of MS 706 is completed, at step 762. Subsequently, at step 764, target gateway 710 forwards the HOComp to serving gateway 702, which forwards the HOComp to serving BS 704 to notify that the handover is completed, at step 766.

After the handover of MS 706 is completed, serving BS 704 sends a datapath de-registration request (Path DE-Reg Req) to serving gateway 702 to remove the datapath associated with MS 706, at step 768. In response to the Path De-Reg Req, serving gateway 702 sends a datapath de-registration response (Path De-Reg Rsp) to serving BS 704 at step 770. Thereafter, the datapath associated with MS 706 is removed from serving BS 704 and serving gateway 702. Additionally, the context information associated with MS 706 is also removed from serving gateway 702 and serving BS 704.

Various embodiments of the invention provide apparatuses and methods for predicting the handover of the MS to one or more target BS in a wireless communication network. By using a control parameter, the need for handover of a MS is predicted before a condition for initiating the handover of the MS actually arises. This enables one or more target BSs and one or more gateways to be prepared for the handover of the MS before the handover of the MS is executed. Thus, the process of preparing the one or more target BSs and the one or more gateways for the handover while performing the handover of the MS is avoided, thereby reducing HET. As a result of this, the MS experiences uninterrupted communication services during the handover.

Those skilled in the art will realize that the above-recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element (s) that may cause any benefit, advantage, or solution to occur or become more pronounced are not to be construed as a critical, required, or essential features or elements of any or all the claims.

What is claimed is:
1. A method for communication in a wireless communication network, the method comprising:
predicting a need for a handover of a Mobile Station (MS) to at least one target Base Station (BS) selected from a plurality of BSs based on a handover threshold, the handover threshold being associated with a quality of a signal received by the MS from a serving BS; and
transferring a datapath associated with the MS to at least one of the at least one target BS and at least one gateway prior to the handover of the MS, the at least one gateway being associated with the serving BS associated with the MS and the at least one target BS, the plurality of BSs including the serving BS.

2. The method of claim 1, wherein the handover threshold includes a first threshold value and a control parameter value, wherein the handover of the MS is performed when a quality of a signal received by the MS from the serving BS is less than the first threshold value and the control parameter value corresponds to a value associated with a quality of a signal.

3. The method of claim 2, wherein predicting the need for the handover includes:
comparing the quality of the signal received by the MS from the serving BS with the handover threshold.

4. The method of claim 3 further comprising:
selecting the at least one target BS from the plurality of BSs when the quality of the signal received by the MS from the serving BS is less than the handover threshold, wherein a quality of a signal received by the MS from each of the at least one target BS is greater than the quality of the signal received by the MS from the serving BS.

5. The method of claim 4, wherein a difference between the quality of the signal received by the MS from each of the at least one target BS and the quality of the signal received by the MS from the serving BS is greater than or equal to a difference between a second threshold value and the control parameter value, the second threshold value corresponding to a value associated with a quality of a signal.

6. The method of claim 3 further comprising:
selecting the at least one target BS from the plurality of BSs when the quality of the signal received by the MS from the serving BS is greater than or equal to the handover threshold, wherein a quality of a signal received by the MS from each of the at least one target BS is greater than or equal to the handover threshold.

7. The method of claim 6, wherein a difference between the quality of the signal received by the MS from each of the at least one target BS and the quality of the signal received by the MS from the serving BS is greater than or equal to a difference between a second threshold value and the control parameter value, the second threshold value corresponding to a value associated with a quality of a signal.

8. The method of claim 2 further comprising:
transferring context information associated with the MS to at least one of the at least one target BS and the at least one gateway in response to predicting the need for the handover of the MS, prior to the handover of the MS.

9. The method of claim 8 further comprising:
performing the handover of the MS to a target BS of the at least one target BS when the quality of the signal received by the MS from the serving BS is less than the first threshold value.

10. The method of claim 9 further comprising:
removing the datapath and the context information from the serving BS, each of the at least one target BS excluding the target BS to which the MS is handed over and each of the at least one gateway excluding a gateway associated with the target BS to which the MS is handed over subsequent to the handover of the MS.

11. The method of claim 1 further comprising:
receiving at least one signal measurement report, wherein each of the at least one signal measurement report includes a quality of a signal received by the MS from one BS of the plurality of BSs.

12. The method of claim 11, wherein the quality of the signal received by the MS is at least one of a Received Signal Strength Indication (RSSI), a Signal to Noise Ratio (SNR), a Signal to Noise Interference Ratio (SNIR) and a Channel to Noise Interference Ratio (CNIR).

13. The method of claim 1, wherein the wireless communication network is one of a WiMAX communication network, a 3rd Generation Partnership Project (3GPP) Long Term Evolution (LTE) network, a 3rd Generation Partnership Project 2 (3GPP2) Ultra Mobile Broadband (UMB) network, a Wireless Fidelity (WiFi) network, and an Orthogonal Frequency Division Multiple Access (OFDMA) communication network.

14. An apparatus for communication in a wireless communication network, the apparatus comprising:
a processor configured to predict a need for a handover of a Mobile Station (MS) to at least one target Base Station (BS) selected from a plurality of BSs based on a handover threshold, the handover threshold being associated with a quality of a signal received by the MS from a serving BS; and
a transceiver configured to transfer a datapath associated with the MS to at least one of the at least one target BS and at least one gateway prior to the handover of the MS, the at least one gateway being associated with the serving BS associated with the MS and the at least one target BS, the plurality of BSs including the serving BS.

15. The apparatus of claim 14, wherein the processor is further configured to:
compare the quality of the signal received by the MS from the serving BS with the handover threshold; and
select the at least one target BS from the plurality of BSs when the quality of the signal received by the MS from the serving BS is less than the handover threshold, wherein a quality of a signal received by the MS from each of the at least one target BS is greater than the quality of the signal received by the MS from the serving BS.

16. The apparatus of claim 14, wherein the processor is further configured to:
compare the quality of the signal received by the MS from the serving BS with the handover threshold; and
select the at least one target BS from the plurality of BSs when the quality of the signal received by the MS from the serving BS is greater than or equal to the handover threshold, wherein a quality of a signal received by the MS from each of the at least one target BS is greater than or equal to the handover threshold.

17. The apparatus of claim 14, wherein the handover threshold includes a first threshold value and a control parameter value, wherein the handover of the MS is performed when a quality of a signal received by the MS from the serving BS is less than the first threshold value and the control parameter value corresponds to a value associated with a quality of a signal.

18. The apparatus of claim 17, wherein the transceiver is further configured to:
transfer context information associated with the MS to at least one of the at least one target BS and the at least one gateway in response to predicting the need for the handover of the MS, prior to the handover of the MS.

19. The apparatus of claim 18, wherein the processor is further configured to:
perform the handover of the MS to a target BS of the at least one target BS when the quality of the signal received by the MS from the serving BS is less than the first threshold value.

20. The apparatus of claim 19, wherein the processor is further configured to:

remove the datapath and the context information from at least one of the serving BS, each of the at least one target BS excluding the target BS to which the MS is handed over and each of the at least one gateway excluding a gateway associated with the target BS to which the MS is handed over subsequent to the handover of the MS.

21. The apparatus of claim 14, wherein the transceiver is further configured to:
  receive at least one signal measurement report from at least one of the MS and the serving BS, wherein each of the at least one signal measurement report includes a quality of a signal received by the MS from a BS of the plurality of BSs.

22. The apparatus of claim 14, wherein the apparatus is one of the serving BS and a gateway associated with the serving BS, wherein the gateway is of the at least one gateway.

23. A method for managing handover in a wireless communication network, the method comprising:
  predicting a need for a handover of a Mobile Station (MS) to at least one target Base Station (BS) selected from a plurality of BSs based on a handover threshold including a first threshold value and a control parameter value, the handover of the MS being performed when a quality of a signal received by the MS from a serving BS is less than the first threshold value and the control parameter value corresponds to a value associated with a quality of a signal, the plurality of BSs including the serving BS.

24. The method of claim 23 further comprising:
  receiving at least one signal measurement report, wherein each of the at least one signal measurement report includes a quality of a signal received by the MS from a BS of the plurality of BSs, wherein predicting the need of the handover of the MS is based on the at least one signal measurement report.

25. An apparatus for managing handover in a wireless communication network, the apparatus comprising:
  a processor configured to predict a need for a handover of a Mobile Station (MS) to at least one target Base Station (BS) selected from a plurality of BSs based on a handover threshold comprising a first threshold value and a control parameter value, the handover of the MS being performed when a quality of a signal received by the MS from a serving BS is less than the first threshold value, the control parameter value corresponding to a value associated with a quality of a signal, the plurality of BSs including the serving BS.

26. The apparatus of claim 25 further comprising:
  a transceiver for receiving signals from each BS of the plurality of BSs, wherein the need for the handover of the MS is predicted based on a quality of signals received.

27. The apparatus of claim 25, wherein the apparatus is the MS.

28. The method of claim 2, wherein the control parameter facilitates predicting the need for the handover of the MS before the quality of the signal received by the MS from the serving BS falls below the first threshold.

* * * * *